(12) United States Patent
Kieffer et al.

(10) Patent No.: US 11,592,377 B2
(45) Date of Patent: Feb. 28, 2023

(54) FATIGUE LIFE SENSOR FOR MEASURING REPETITIVE LOADS APPLIED TO A STRUCTURE BASED UPON CRACKS PROPAGATING FROM CRACK INITIATION FEATURES OF THE SENSOR

(71) Applicant: Vishay Measurements Group, Inc., Wendell, NC (US)

(72) Inventors: Thomas P. Kieffer, Raleigh, NC (US); James I. Hardy, Garner, NC (US); Robert B. Watson, Clayton, NC (US)

(73) Assignee: Vishay Measurements Group, Inc., Wendell, NC (US)

( * ) Notice: Subject to any disclaimer, the term of this patent is extended or adjusted under 35 U.S.C. 154(b) by 470 days.

(21) Appl. No.: 16/853,255

(22) Filed: Apr. 20, 2020

(65) Prior Publication Data
US 2021/0325284 A1     Oct. 21, 2021

(51) Int. Cl.
*G01N 3/06* (2006.01)
*G01N 3/32* (2006.01)

(52) U.S. Cl.
CPC ........... *G01N 3/066* (2013.01); *G01N 3/32* (2013.01); *G01N 2203/0005* (2013.01); *G01N 2203/0019* (2013.01); *G01N 2203/0073* (2013.01); *G01N 2203/0617* (2013.01)

(58) Field of Classification Search
CPC ......... G01N 3/066; G01N 3/32; G01N 27/72; G01N 27/902; G01N 27/9046; G01N 27/904; G01N 2203/0005; G01N 2203/0019; G01N 2203/0073; G01N 2203/0617; G01N 27/9013; G01N 3/062; G01N 3/34; G01N 27/90; G01B 5/30; G01B 7/16; B24B 37/005; G01M 5/0033; G01M 13/00; G01M 1/02
See application file for complete search history.

(56) References Cited

U.S. PATENT DOCUMENTS

| | | | |
|---|---|---|---|
| 3,272,003 A | 9/1966 | Harting | |
| 6,532,825 B1 | 3/2003 | Abe | |
| 9,927,311 B2 | 3/2018 | Kang et al. | |
| 10,302,459 B2 * | 5/2019 | Huang | H05K 1/111 |
| 2001/0037686 A1 * | 11/2001 | Nihei | G01B 5/30 |
| | | | 73/799 |

FOREIGN PATENT DOCUMENTS

| | | | |
|---|---|---|---|
| JP | 2001-272319 A | | 10/2001 |
| JP | 2001272319 A | * | 10/2001 |
| JP | 2006-030163 A | | 2/2006 |
| JP | 2017-150931 A | | 8/2017 |

* cited by examiner

*Primary Examiner* — Brandi N Hopkins
(74) *Attorney, Agent, or Firm* — Howson & Howson LLP

(57) ABSTRACT

A sensor for measuring the fatigue life of a structure subjected to repetitive loads is disclosed. The sensor includes a backing material arranged for securement to the structure, and a foil arranged for securement to the backing material. The foil includes a conductive path along which electrical current flows at an initial resistance measured prior to the structure being subjected to repetitive loads. A crack initiation feature in the form of a notch is located on the conductive path. In response to repetitive loads applied to the structure, one or more cracks propagate from the crack initiation feature across the conductive path to cause electrical resistance to increase whereby the progression of fatiguing of the structure may be determined.

21 Claims, 7 Drawing Sheets

FATIGUE LIFE SENSOR FOR MEASURING REPETITIVE LOADS APPLIED TO A STRUCTURE BASED UPON CRACKS PROPAGATING FROM CRACK INITIATION FEATURES OF THE SENSOR

FIELD OF INVENTION

This invention relates generally to testing of structures and more particularly to a sensor to be used for measuring accumulated fatigue damage in a structure which is subjected to repeated loading.

BACKGROUND

It has long been recognized that due to the repetitive nature of loads imposed on structures such as aircraft wings, bridge trusses, and machine elements (e.g., cranks, pistons, rocker arms, etc.), these structures suffer fatigue damage over time, and the useful life of such structures is limited by the amount of fatigue damage they can withstand and still retain a reasonable margin of safety.

It has long been the practice in the industry to test the materials of construction in such structures in a laboratory under simulated operating conditions to determine their actual fatigue life. A fatigue specimen would be fabricated of the same material as the structure to be investigated, e.g., steel or aluminum. For example, the structure may be a bridge truss, or an airplane wing, etc. The fatigue specimen may have similar physical attributes as the structure, e.g., thickness, surface finish, strength, etc. The fatigue specimen may be provided with a notch or some other feature that will initiate crack propagation upon the fatigue specimen being subjected to cyclic loading. Specialized fatigue machines are used to apply repetitive loads to simulate forces the structure would experience in the field. The fatigue specimen is bolted into a gripping mechanism on the fatigue loading machine. The repetitive loads are applied directly to the bolts of the fatigue specimen until an initial crack propagates from the notch across the width of the fatigue specimen until it can no longer support the applied loading and total failure occurs when the fatigue specimen breaks into two pieces.

While these laboratory testing methods have been generally quite successful in preventing fatigue failures, they are not always helpful in estimating the accumulated fatigue damage or remaining fatigue life of a particular structure placed in actual service. It is known that the environment can have a substantial effect on fatigue life of a particular structure placed in service, and that it may be quite difficult to duplicate environmental conditions in the laboratory.

One solution to these problems which has been suggested by others is to place a gage or indicator directly on a structural member in actual service which will indicate the accumulated fatigue damage suffered by the member and/or the remaining fatigue life after a given period of service. One such gage intended for placement directly upon the structural member is commonly known as a fatigue coupon.

The fatigue coupon resembles the fatigue specimen described above in that it may possess a notch or some other feature that will initiate crack propagation upon being subjected to cyclic loading. The fatigue coupon is intended to be bolted directly onto the structure to be fatigue tested. The repetitive loads in the structure are applied directly to the bolts of the fatigue coupon until an initial crack propagates from the notch across the width of the fatigue coupon until it can no longer support the applied loading and total failure occurs when the fatigue coupon breaks into two pieces. Alternatively, the fatigue coupon can be periodically removed from the structure under test and the surfaces can be inspected for the presence and appearance of cracks which may have initiated and elongated (partially propagated).

One disadvantage to the foregoing fatigue coupon is the fact that holes must be drilled into the structure to enable bolting of the fatigue coupon in place. Such drilled holes could weaken the structure or alter its actual stress field.

Another type of sensor for measuring accumulated fatigue damage in a structure is an adaptation of a metal foil strain gage. A metal foil strain gage consists of an insulating backing material and a metal foil arranged in the form of a grid. The strain gage can be attached to the structure with an adhesive (as opposed to the fatigue coupon, which is bolted at its ends to the structure) and is thereby subjected to the same surface strains as the structure experiences in service. The strain gage is connected into a Wheatstone bridge circuit to enable measurement of small changes in electrical resistance which corresponds to surface strains on the structure. The adapted metal foil strain gage utilizes foil in an annealed or softened condition. Upon cyclically loading of the structure to which the adapted strain gage is bonded, the soft foil begins to work harden, and its resistance increases. Also, as an unintended consequence, as the foil hardens, it may develop cracks which also contribute to increasing resistance. Eventually, due to hardening and crack propagation, the foil will eventually fracture, at which point the resistance becomes infinite.

One such adapted strain gage is described in U.S. Pat. No. 3,272,003 to D. R. Harting dated Sep. 13, 1966. This patent discloses a gage which utilizes a grid of conductive material in the form of a foil or wire which is to be mounted on the structure in question. When the part is subjected to repetitive loading, the electrical resistance of the gage gradually changes, and this change in resistance can be correlated with fatigue damage by performing laboratory tests on the same p art.

One disadvantage to the metal foil strain gage is that the resulting resistance change obtained from loading of thousands of cycles, may be relatively small, or even imperceptible, e.g., less than ten percent. As change in resistance is an indicator of fatigue damage, it would be beneficial to have a greater and more perceptible change in resistance (or greater sensitivity) than provided by such metal foil strain gages.

SUMMARY OF THE INVENTION

A sensor for measuring the fatigue life of a structure subjected to repetitive loads is disclosed. The sensor includes a backing material arranged for securement to the structure, and a foil arranged for securement to the backing material. The foil includes a conductive path along which electrical current flows at an initial resistance measured prior to the structure being subjected to repetitive loads. A crack initiation feature in the form of a notch is located on the conductive path. In response to repetitive loads applied to the structure, one or more cracks propagate from the crack initiation feature across the conductive path to cause electrical resistance to increase whereby the progression of fatiguing of the structure may be determined.

BRIEF DESCRIPTION OF THE DRAWINGS

The invention will be described in conjunction with the following drawings in which like reference numerals designate like elements and wherein.

DETAILED DESCRIPTION OF THE PREFERRED EMBODIMENTS

Figure 1:
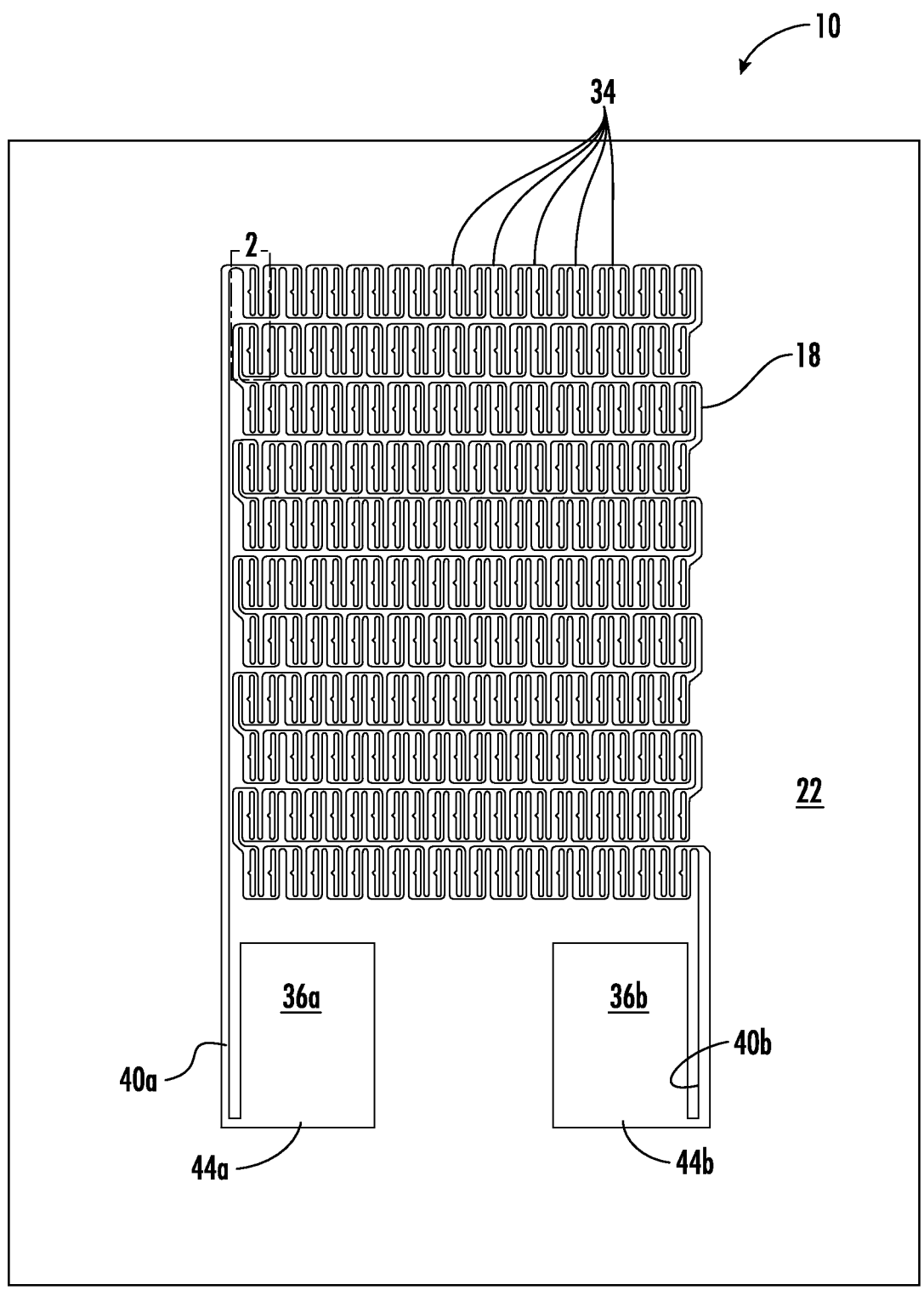
FIG. 1 is a plan view of the fatigue life sensor of the present invention illustrating the foil portion bonded to a backing material.
Figure 2:
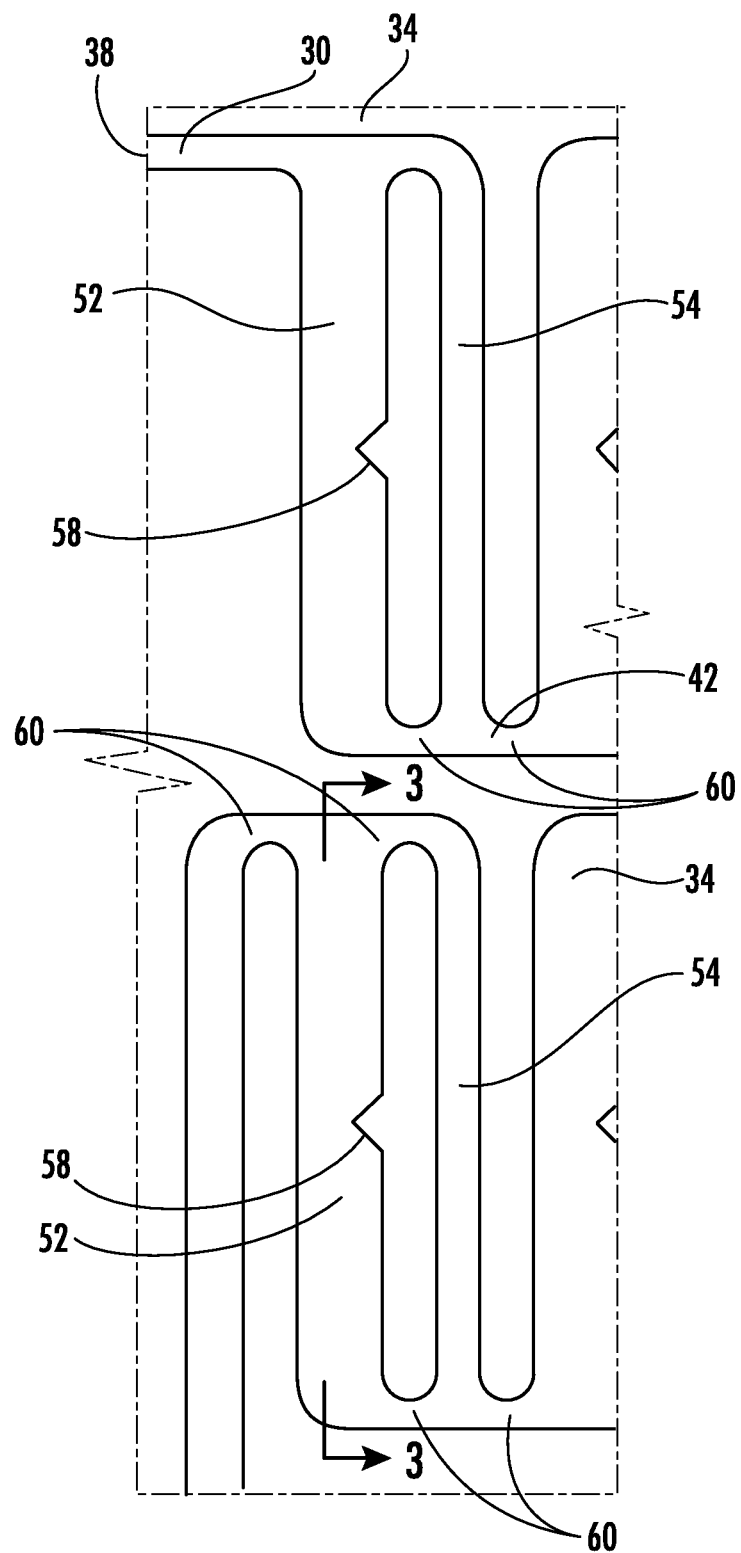
FIG. 2 is a detail view of the fatigue life sensor taken along line 2-2 of FIG. 1 illustrating two exemplary fatigue elements situated adjacent to one another.
Figure 3:
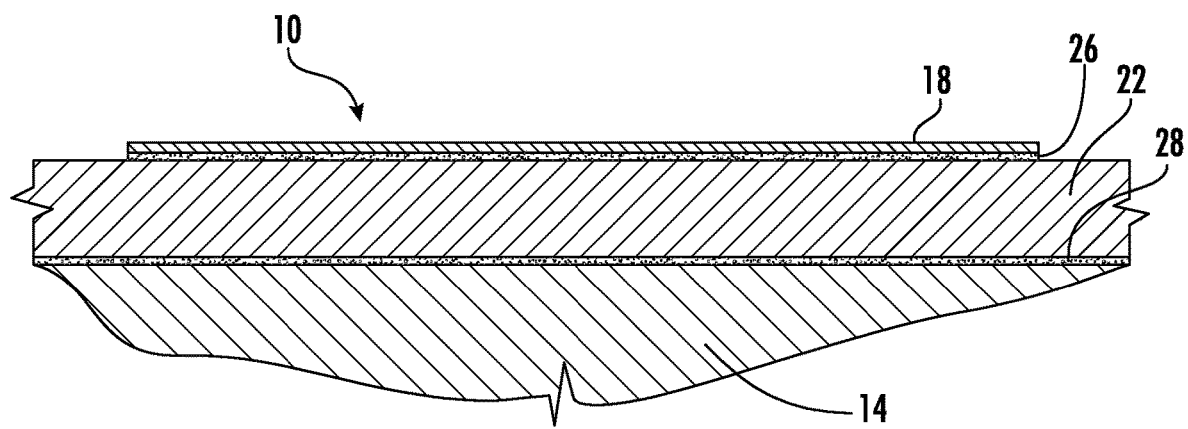
FIG. 3 is a sectional view taken along line 3-3 of FIG. 2.

Referring now to FIGS. 1 through 4C, there is shown a preferred embodiment of the fatigue life sensor 10 of the present invention. As best illustrated in FIG. 3, the fatigue life sensor 10 is shown mounted to a structure 14 such as an aircraft wing, a bridge truss, or any other structure that suffers fatigue as the result of being subjected to cyclic loading during service. The fatigue life sensor 10 includes an upper layer, which is a foil 18 made of a suitable electrically conductive material, the foil being bonded to a backing material 22, which serves as a lower layer. Together, the upper and lower layers comprising the fatigue life sensor 10 are bonded to the structure 14.

In an embodiment, the foil 18 may be made from one or multiple of nickel alloys. In that case, the flat metallic foil 18 may be made from at least one alloy from a group comprising copper-nickel, nickel-chromium, nickel-aluminum, etc. Preferably, the flat metallic foil 18 may be made from at least one of copper-nickel, nickel-chromium or nickel-aluminum. The foil is attached to the backing material 22 using any suitable adhesive 26, such as epoxies, cyanoacrylate, polyester adhesives, etc.

The foil 18 is applied to the backing material 22 utilizing a lamination process, and a conductive path 30 (FIG. 2) is formed through known processes including photolithography and chemical etching.

The backing material 22 may be formed of any suitable electrically insulating plastic material. For example, the backing material 22 may be made from one or multiple resin materials. In an embodiment, the backing material 22 may be made from at least one resin material from a group comprising polyimide, polyester, fiber-reinforced epoxy, polyether ether ketone, etc. Preferably, the backing material 22 may be made from at least one of polyimide, polyester, fiber-reinforced epoxy or polyether ether ketone. The above exemplary resin materials are not intended to be exclusive or be limiting to the present application. The backing material 22 may be bonded to the structure 14 using any suitable adhesive 28 such as epoxies, cyanoacrylate, polyester adhesives, etc.

It is important that strain resulting from cyclic loading applied to the surface of the structure 14 be transmitted through the adhesive layer 28, through the backing material 22, through the laminating adhesive 26, and into the foil 18.

Figure 4A:
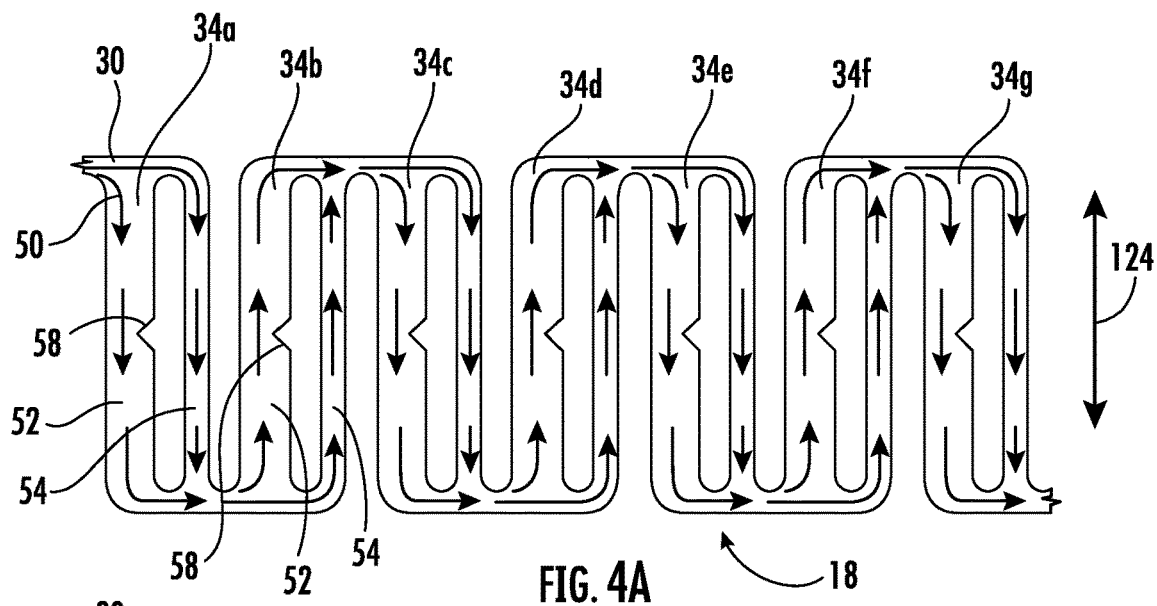
FIGS. 4A through 4C is a detail view of several exemplary fatigue elements situated in series with electrical current running therethrough to illustrate the manner of operation of the fatigue life sensor of the present invention.
Figure 4B:
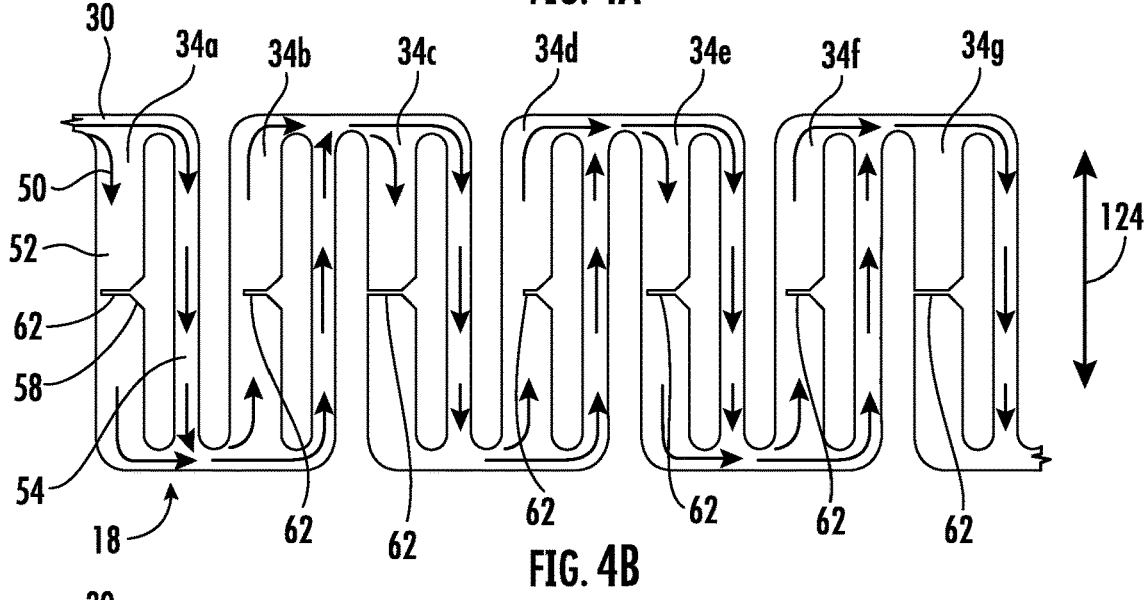
Figure 4C:
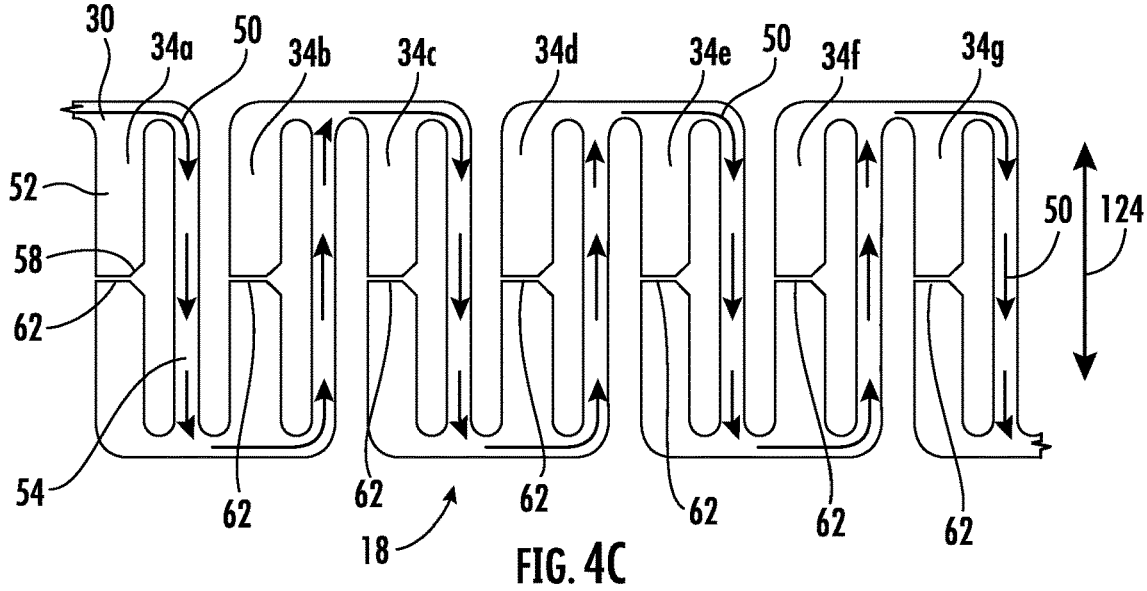

As best shown in FIGS. 2 and 4A through 4C, the foil 18 is comprised of a plurality of fatigue elements 34 integral with each other and arranged in series. In FIG. 2, two fatigue elements 34 are illustrated in close-up for purposes of explanation. However, it should be understood that any number of fatigue elements 34 may be arranged on the fatigue life sensor 10. For example, as best shown in FIGS. 4A through 4C, seven fatigue elements 34a through 34g are arranged in series in each figure. In addition, as best shown in FIG. 1, approximately 240 substantially identical fatigue elements 34 are joined in series on the fatigue life sensor 10. As best shown in FIG. 1, the foil 18 comprising the totality of the fatigue elements 34 may be joined to solder pads 36a and 36b by lead traces 40a and 40b. In this manner, the fatigue life sensor 10 may be connected to a power source (not shown), e.g., a direct current power source such as a battery, to create an electrical current within the fatigue life sensor 10. In addition, an ohmmeter (not shown) could be included in the circuit to measure electrical resistance within the fatigue life sensor 10 across all fatigue elements 34.

As best illustrated in FIGS. 2 and 4A, a first fatigue element 34a includes an inlet 38 through which current 50 enters along the conductive path 30, and an outlet 42 through which the current 50 exits to a second fatigue element 34b adjacent to and integral with the first fatigue element 34a. As best shown in FIGS. 2 and 4A through 4C, upon entry at the inlet end 38 of each fatigue element, the flow of current 50 is divided into two conductive paths, an active path 52 and a passive path 54, the paths being arranged in parallel, and each path having a relatively uniform width. For example, the active path 52 could be 0.003 inch in width, while the passive path 54 could be 0.001 inch in width.

Both the active path 52 and the passive path 54 extend from the inlet 38 to the outlet 42 of each fatigue element 34. Current indicated by arrow 50 flows along the active 52 and passive 54 paths at an initial resistance value measured prior to the structure being subjected to any repetitive loads. This initial resistance value may be relatively low, e.g., 100 ohms.

As best shown in FIG. 2, the active path 52 of each fatigue element 34 includes a crack initiation feature 58 in the form of a triangle-shaped notch which intrudes into the active path 52. The triangle shape of the crack initiation feature 58 is merely exemplary, and other geometric shapes may be employed to enable the function of crack initiation. For example, the crack initiation feature could be a semi-circle. The crack initiation feature 58 provides an area of narrowing along each active path 52. As best shown in FIG. 2, the crack initiation feature 58 or notch is located approximately midway along the length of the active path 52 to maximize the amount of strain that is detected from the structure 14 to which the fatigue life sensor 10 is attached. However, it should be understood that the location of the crack initiation feature 58 or notch could readily be adjusted to any location along the length of the active path 52, either above or below the midpoint where the crack initiation feature 58 is illustrated as being located in FIG. 2. In this manner, the sensitivity of the fatigue life sensor 10 may be adjusted downwardly from this location of peak sensitivity, as shown in FIG. 2.

Referring now to FIG. 2, it should also be mentioned that each conductive path 30 includes end-loops 60, which are curved portions of the active and passive paths 52, 54 located at the upper and lower extent of these paths, 52 and 54, respectively. In fabricating the foil 18 through the photolithography and chemical etching processes, the height of the end loops 60 should be kept relatively short, e.g., no greater than 0.001 inch in height. By designing these end loops 60 to be relatively short in height, the inadvertent formation of cracks in the vicinity of these end loops 60 during cyclic loading (as indicated by axis 124 in FIGS. 4A through 4C) may be substantially reduced. The details of this design feature are discussed below in connection with implementing this design feature on a conventional strain gage 80.

As best shown in FIG. 4A, prior to the structure 14 being subjected to any cyclic loading as applied along measurement axis 124, no cracks have yet initiated at the crack initiation feature 58 of any of the fatigue elements 34a through 34g, and an initial relatively low resistance can be measured. Referring now to FIG. 4B, over time, as the structure 14 is subjected to repetitive cyclic loading, as applied along measurement axis 124, cracks 62 begin to appear to a greater or lesser extent at the crack initiation feature 58 of each fatigue element 34a through 34g. As is clearly shown in FIG. 4B, cracks 62 progress across the active path 52 of each fatigue element 34a through 34g at different rates. For example, as best shown in FIG. 4B, cracks 62 progress most rapidly at the fatigue elements 34c and 34g, while cracks 62 progress comparatively less progressively at fatigue elements 34a and 34e, and comparatively, even less progressively at fatigue elements 34b and 34f, and comparatively least progressively at 34d. As each crack 62 progresses across its active path 52, the electrical resistance along that path 52 increases, thus providing an average increase across all cracks 62.

As best shown in FIG. 4C, with additional cyclic loading applied along measurement axis 124, the cracks 62 in each of the fatigue elements 34a through 34g are shown as having reached entirely across their respective active paths 52. Once the crack 62 reaches completely across the active path 52, the flow of current through the active path 52 ceases and resistance of the active path 52 becomes infinite. However, current 50 continues to flow through the passive path 54, and therefore, the overall resistance of the overall conductive path 30 reaches a terminal resistance value, rather than the entire conductive path 30 going infinite. When all active paths 52 within the fatigue life sensor 10 fail, then the fatigue life sensor 10 reaches an overall terminal resistance which may be calibrated to correspond with the fatigue life of the structure 14. For example, this terminal resistance has been shown to be twice the initial resistance value. Thus, from an instrumentation standpoint, providing an initial resistance of approximately 100 ohms and a terminal resistance of approximately 200 ohms provides a suitable bandwidth of sensitivity to enable effective tracking of the structure 14 for fatigue damage.

Referring again to FIG. 1, the fatigue life sensor 10 includes conductor traces 40a and 40b extending downwardly from the foil 18 for connection to the solder pads 36a and 36b, respectively, located below the foil 18. As shown in FIG. 1, the conductor traces 40a and 40b connect to the solder pads 36a and 36b at the free ends of the solder pads 44a and 44b. Specifically, as best shown in FIG. 1, the conductor trace 40a connects to the solder pad 36a at a point in the lower left hand corner of the solder pad 36a, while conductor trace 40b connects to the solder pad 36b at a point in the lower right hand corner of the solder pad 36b. By connecting to the solder pads 36a and 36b in the vicinity of the free ends of the solder pads 44a and 44b, which is in the vicinity of the free end of the fatigue life sensor 10, inadvertent formation of cracks during cyclic loading of the structure 14 is substantially reduced.

In this manner, by measuring increasing resistance of the fatigue life sensor 10 over time, the progression of the fatigue life of the structure 14 may be measured and monitored so that the structure may be removed from service upon the sensor reaching a predetermined resistance value corresponding with the fatigue life of the structure 14.

Figure 5:
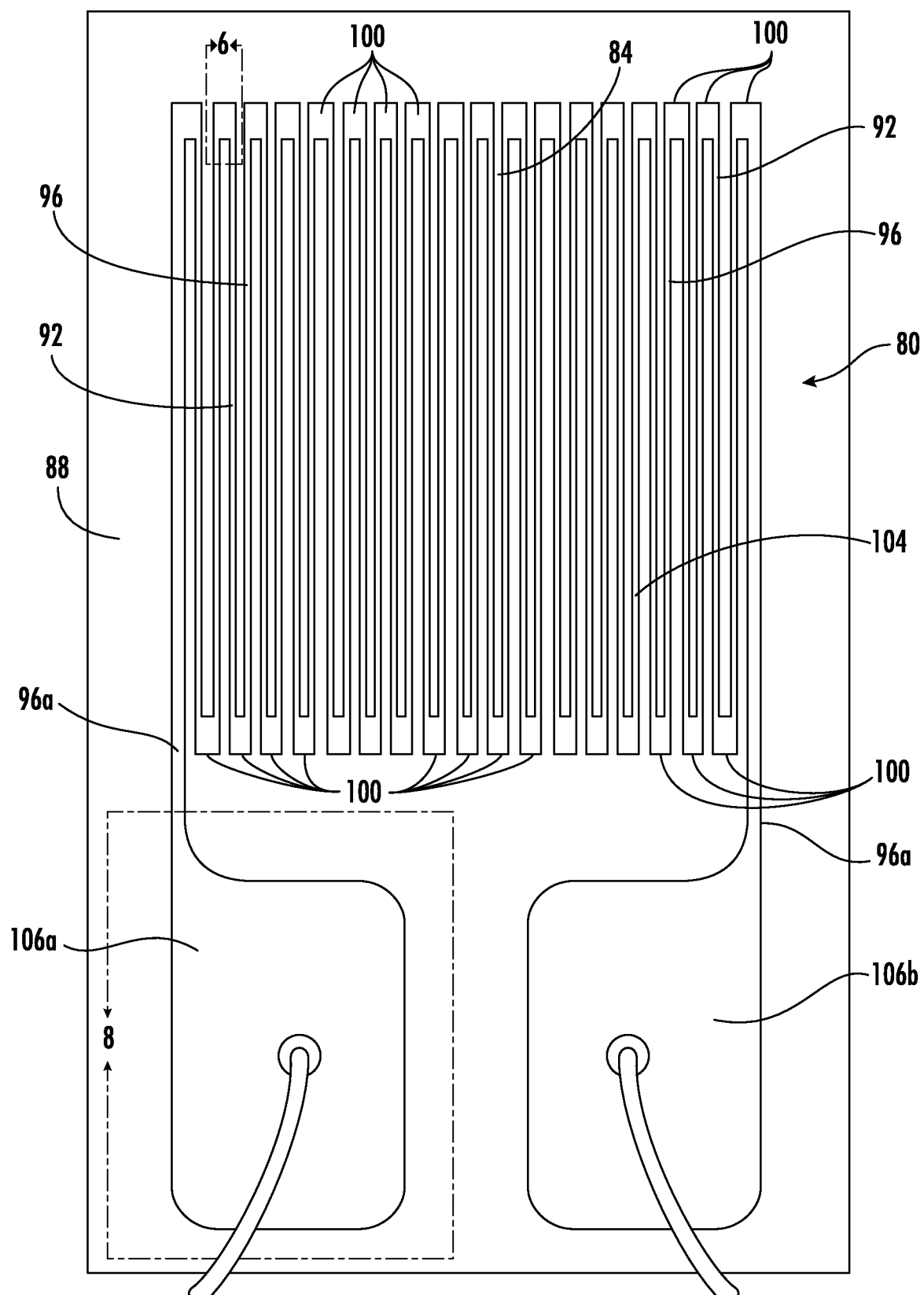
FIG. 5 is a plan view of a conventional strain gage.

Referring now to FIG. 5, there is shown a plan view of a conventional strain gage 80 which is intended for measuring surface strains on solid materials to which the gage 80 is attached. Such solid materials may include an aircraft wing, a bridge truss, or any other structure that suffers fatigue as the result of being subjected to cyclic loading during service. As discussed above, a common type of strain gage is the etched-foil strain gage. Such conventional strain gages work on the same principle of engineering strain. That is, a starting gage length is deformed to a final gage length with a corresponding change in electrical resistance proportional to the deformation. The gage has an initial length (LO) and when stretched (e.g., with the specimen to which it is attached), a final length (L 1). As the conductor of the gage changes length, there is a corresponding change in resistance. It is this resistance change that is measurable and relatable to engineering strain.

Ideally, the strain that is developed in the grid lines of the strain gage is identical to the part to which the strain gage is attached. However, strain gages are also structures, and like all metals, the sensing grid can break when cyclically strained. However, long before visible damage (cracking or breaking), the strain gage will exhibit erroneous resistance changes, rendering them unusable as accurate strain sensors. The number of cycles sustainable by a particular gage before it begins yielding poor data is commonly referred to as the fatigue life of the gage. As discussed above, when subjected to continued cyclic loading, small cracks will form in the grid area of the foil, often at the transition between the straight grid line and the curved end loop, causing erroneous resistance changes. Erroneous resistance changes can also arise due to cold working of the strain gage. By substantially reducing or completely eliminating the formation of these fatigue cracks, erroneous resistance changes can be minimized, thus increasing the fatigue life of the strain gage.

The conventional metal foil strain gage 80 includes an upper layer, which is a foil 84 made of a suitable electrically conductive material, the foil being bonded to a backing material 88, which serves as a lower layer. The conventional strain gage 80 is arranged to be bonded to the structure which is subjected to cyclic loading, as described above.

The foil 84 may be made from one or multiple of nickel alloys. In that case, the flat metallic foil 84 may be made from at least one alloy from a group comprising copper-nickel, nickel-chromium, nickel-aluminum, etc. Preferably, the flat metallic foil 84 may be made from at least one of copper-nickel, nickel-chromium or nickel-aluminum. The foil 84 is attached to the backing material 88 using any suitable adhesive, such as epoxies, cyanoacrylate, polyester adhesives, etc.

Figures 6, 7:
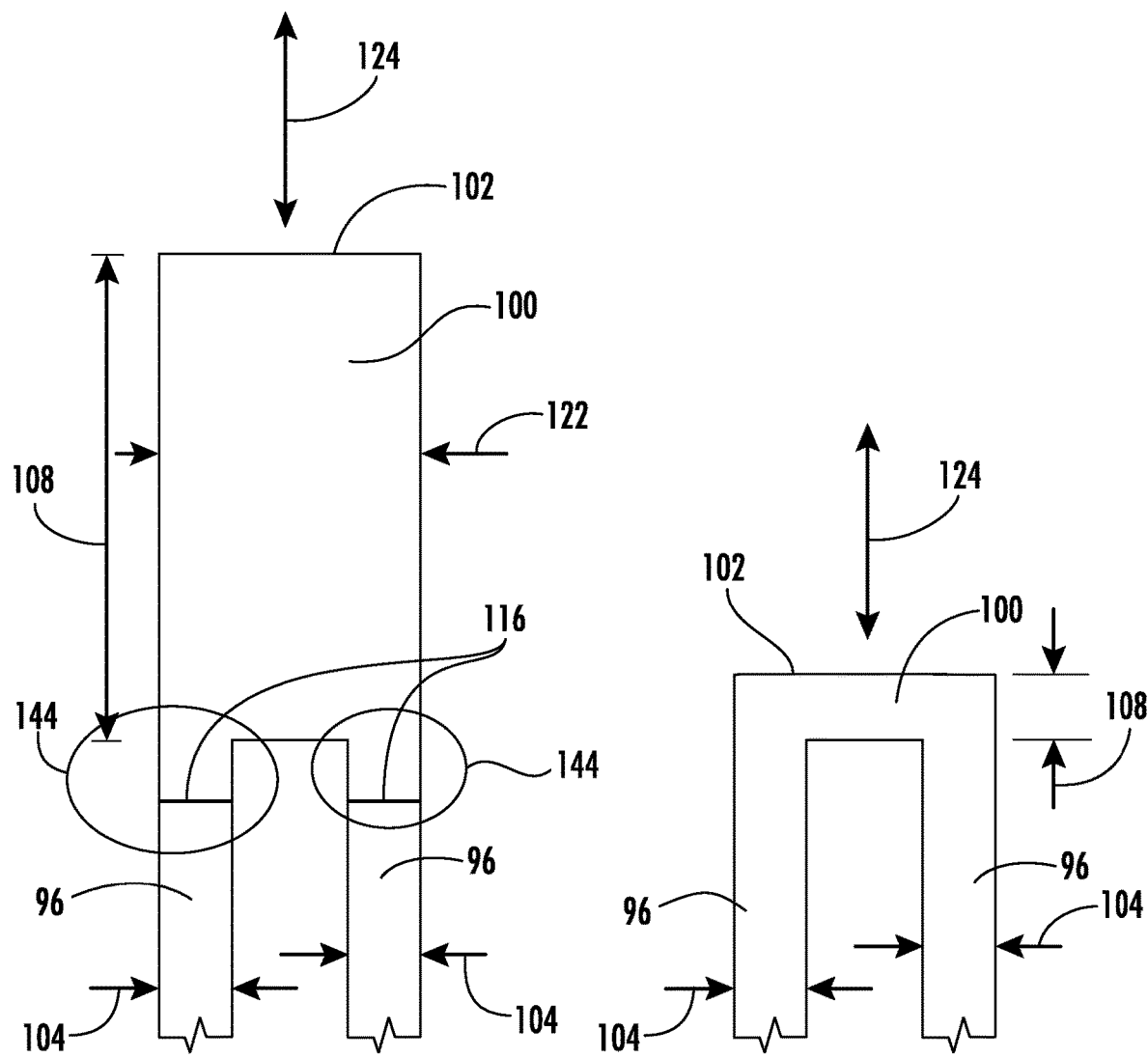
FIG. 6 is a close-up view taken along line 6-6 of FIG. 5 illustrating the details of an end loop of a conventional strain gage.
FIG. 7 is an enlarged view illustrating the details of an end loop of the present invention for incorporating on a conventional strain gage.

The foil 84 is applied to the backing material 88 utilizing a lamination process, and a conductive path 92 is formed through known processes including photolithography and chemical etching. As best shown in FIGS. 5 and 6, the conductive path 92 comprises a plurality of grid lines 96 that are approximately equal in length and are arranged vertically parallel to each other. At their ends, the grid lines 96 are integral with (or connected to) end loops 100 arranged above and below the grid lines 96. The end loops 100 connect the grid lines 96 to one another in series to form a single serpentine-shaped conductive path 104. The serpentine shape enables the foil 84 to remain compact in size. By adjusting the number of grid lines 96 and end loops 100, the user may adjust the starting resistance of the strain gage 80. Because resistance changes when measuring fatigue tend to be very small, typically, the starting resistance of a strain gage 80 is provided as one of three values, i.e., 120 ohms, 350 ohms, or 1,000 ohms. The outer grid lines 96a are shown as being slightly greater in width to make them stronger for attachment to solder pads 106a and 106b.

The backing material 88 may be formed of any suitable electrically insulating plastic material. For example, the backing material 88 may be made from one or multiple resin materials. In an embodiment, the backing material 88 may be made from at least one resin material from a group comprising polyimide, polyester, fiber-reinforced epoxy, polyether ether ketone, etc. Preferably, the backing material 88 may be made from at least one of polyimide, polyester, fiber-reinforced epoxy or polyether ether ketone. The above exemplary resin materials are not intended to be exclusive or be limiting to the present application. The backing material 88 may be bonded to the structure using any suitable adhesive such as epoxies, cyanoacrylate, polyester adhesives, etc.

In FIG. 6, an exemplary end loop 100 of the conventional strain gage 80 is shown as being integral with two of the grid lines 96. The end loop 100 and grid lines 96 are illustrated in close-up for purposes of explanation. Each grid line 96 may be of any suitable width, e.g., approximately 0.001 inch in width, as indicated at 104. Each of the end loops 100 may be of any sufficient height (as indicated at 108) so as to maximize sensitivity in the grid lines 96 and thus maximize accuracy of the strain gage 80, which is critical in the case of objects such as bridges and aircraft wings. For example, conventional end loops 100 may be approximately 0.012 inch in height, which is substantially greater than the width 104 of the grid lines 96. Each end loop 100 includes a free end 102, which is an area that rarely is subjected to a load, such that during cyclic loading, fatigue cracks typically do not form at the free ends 102 of the end loops 100. However, as one travels from the free end 102 of the end loops 100 to transition areas 144 where the grid lines 96 exit from the end loop 100, there is an abrupt change in cross-section from the full width 122 of the end loop 100 to the much narrower width 104 of the grid lines 96. During cyclic loading, as applied along measurement axis 124, such an abrupt reduction in cross-section will result in increased strain in the transition areas 144 causing fatigue cracks 116 to develop in the grid lines 96 in this area.

Referring now to FIG. 7, there is shown an inventive end loop 100 feature incorporated into the conventional strain gage 80. In particular, the height of the end loop 100 has been substantially reduced from its height 108 (FIG. 6), to a height 108 (FIG. 7) that is approximately equal to the width 104 of the grid lines 96, e.g., 0.001 inch. By reducing the height of the end loops 100 in this manner, the strain field discussed above will not fully develop in the transition area 144, thus substantially eliminating the likelihood of the formation of fatigue cracks 116 in the grid lines 96 in the transition area 144. The inventive end loop 100 described herein in connection with the strain gage 80, may also be incorporated in the fatigue life sensor 10 described above.

Figure 8:
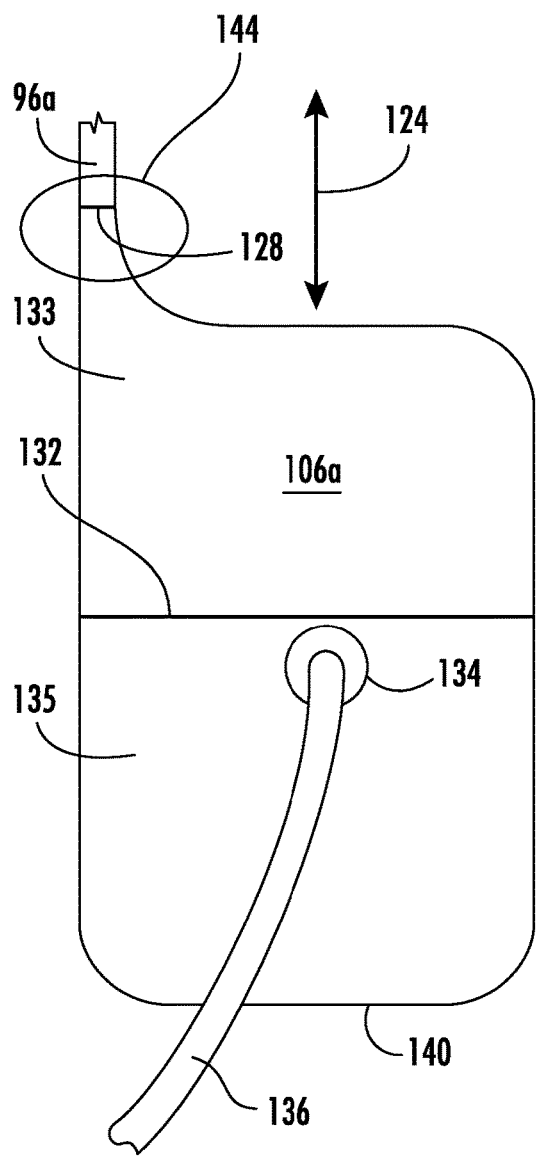
FIG. 8 is a close-up view taken along line 8-8 of FIG. 5 illustrating the details of a solder pad of a conventional strain gage; and, FIG. 9 is an enlarged view illustrating an inventive manner for connecting the solder pad to the foil of the conventional strain gage.

Referring now to FIG. 8, there is shown the leftmost solder pad 106a of the conventional strain gage 80 of FIG. 5. A lead wire 136 is shown attached to the center-portion of solder pad 106a at an attachment point 134. This attachment point 134 causes an amplification of the surface strain in this area of the solder pad 106a, which upon cyclic loading, applied along measurement axis 124, may lead to a tangent fatigue crack 132 developing in the solder tab 106a. Such a tangent fatigue crack 132 is a most common form of fatigue failure for a conventional strain gage 80. As shown in FIG. 8, the fatigue crack 132 separates the solder pad 106a into an upper portion 133 and a lower portion 135. By separating the solder pad 106a into two portions, the flow of current through the lead wire 136 to the foil 84 (FIG. 5) is interrupted, thus rendering the strain gage 80 unusable.

Referring again to FIG. 8, the outer grid line 96a of the foil 84 (FIG. 5) is shown extending to the top of the solder pad 106a at a transition area 144, which is a location where stress concentration develops. In response to cyclic loading of the strain gage 80 along measurement axis 124, it is common for small fatigue cracks 128 to form in this transition area 144. Such fatigue cracks 128 will cause the strain gage 80 to exhibit erroneous resistance changes, thus rendering the strain gage 80 unusable as accurate strain sensors.

Figure 9:
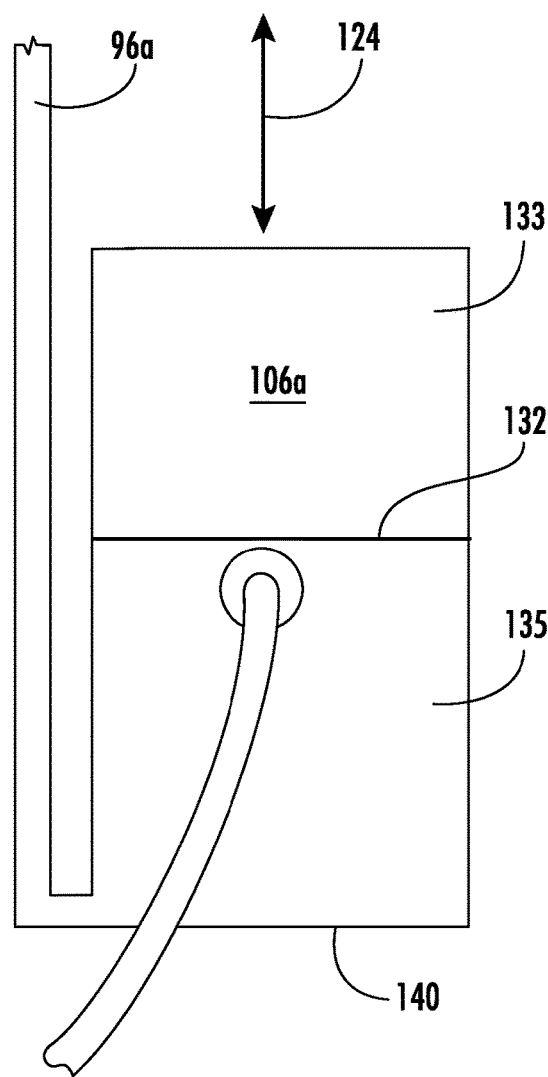

Referring now to FIG. 9, to address both of the drawbacks discussed above, the outer grid line 96a is extended downwardly from a point of connection at the top of the solder pad 106a in the transition area 144 (FIG. 8), to connect with the left solder pad 106a at its free end 140. The free end 140 of the solder pad 106a is an area that is largely free of stress concentration. Surface strain from the part to which the strain gage 80 is attached is not replicated at the free end 140 of the solder pads 106a and 106b. By connecting the grid line 96a to the free end 140, rather than at the transition area 144 (FIG. 8), the formation of fatigue cracks in the outer grid line 96a during cyclic loading, applied along measurement axis 124, is substantially reduced. In addition, by joining the outer grid line 96a to the solder pad 106b at the solder pad free end 140, in the event a fatigue crack 132 propagates across the width of the solder pad 106a during cyclic loading, the flow of current from the power source (not shown) to the foil 84 will remain uninterrupted. In this manner, the strain gage 80 will continue to provide accurate resistance readings. This feature of connecting to the free end 140 of the solder pads described in connection with the strain gage 80 may also be incorporated in the fatigue life sensor 10 described above.

The description herein is intended to illustrate possible implementations of the present invention and is not restrictive. While this disclosure has been made in connection with specific forms and embodiments thereof, it will be appreciated that various modifications other than those discussed above may be resorted to without departing from the spirit or scope of the claimed invention. Such variations, modifications, and alternatives will become apparent to the skilled artisan upon review of the disclosure. For example, functionally equivalent elements or method steps may be substituted for those specifically shown and described, and certain features may be used independently of other features, and in certain cases, particular locations of elements or sequence of method steps may be reversed or interposed, all without departing from the spirit or scope of the invention as defined herein. The scope of the claimed invention should therefore be determined with reference to the description above along with their full range of equivalents.

What is claimed is:

1. A sensor for measuring the fatigue life of a structure subjected to repetitive loads applied along a measurement axis, said sensor comprising:
   a backing material arranged for securement to the structure; and a foil arranged for securement to said backing material, said foil aligned with the measurement axis and defining a conductive path along which electrical current flows in a direction and at an initial resistance prior to the structure being subjected to repetitive loads;

wherein said conductive path includes a grid of a plurality of fatigue elements joined in series by a plurality of end loops;

wherein each of said fatigue elements comprises an inlet, an outlet, an active path, and a passive path, said active path and said passive path being connected to said inlet and outlet in parallel;

wherein said active path of each of said fatigue elements comprises a crack initiation feature and said passive path of each of said fatigue elements being free of any crack initiation feature;

wherein said crack initiation feature of each of said active paths comprises a notch intruding into said active path; and wherein, in response to repetitive loads applied along the measurement axis, one or more cracks propagate from said crack initiation features and across said active paths to cause electrical resistance to increase from said initial resistance to a predetermined resistance whereby the progression of fatiguing of the structure may be determined.

2. The sensor of claim 1, wherein in response to repetitive loads applied to the structure along the measurement axis, strain is transmitted from the structure through the backing material and into the foil to propagate the one or more cracks from said crack initiation features.

3. The sensor of claim 1, wherein the one or more cracks propagate across said active paths of said fatigue elements of said conductive path in a direction generally transverse to the flow of the electric current.

4. The sensor of claim 1, wherein said predetermined resistance corresponds with a resistance measured once said one or more cracks propagate transversely across the entire width of each of said active paths of each of said fatigue elements such that current continues to flow only through said passive paths of each of said fatigue elements.

5. The sensor of claim 1, wherein said predetermined resistance is twice the amount of the initial resistance.

6. The sensor of claim 1, wherein said grid comprises approximately 240 fatigue elements.

7. The sensor of claim 1, wherein said foil is approximately 0.0005 inch in thickness or less.

8. The sensor of claim 1, wherein said backing material is approximately 0.005 inch thick or less.

9. The sensor of claim 1, wherein the width of each of the crack initiation features is approximately 0.001 inch, and the width of each of the active paths at the crack initiation feature is approximately 0.002 inch.

10. The sensor of claim 1, wherein each of said end loops has a height equal to or less than 50 percent of the width of the active path at the crack initiation feature.

11. The sensor of claim 1, wherein each of said end loops has a height equal to approximately 0.001 inch.

12. The sensor of claim 1, wherein said sensor additionally comprises a free end and at least one solder pad disposed on said backing material at said free end, said solder pad having a free end located furthest from said grid, said sensor additionally comprising at least one lead trace extending from said grid for connecting to said free end of said at least one solder pad.

13. A method of measuring the fatigue life of a structure subjected to repetitive loads, said method comprising:

providing a sensor comprising a foil arranged for securement to a backing material, the foil including a conductive path along which electrical current flows in a direction at an initial resistance prior to the structure being subjected to repetitive loads, the foil conductive path including a grid of a plurality of fatigue elements joined in series by a plurality of end loops, each of said fatigue elements comprising an inlet, an outlet, an active path, and a passive path, said active path and said passive path being connected in parallel to said inlet and outlet, and said active path of each of said fatigue elements comprising a crack initiation feature and said passive path of each of said fatigue elements being free of any crack initiation feature, said crack initiation feature of each of said active paths comprising a notch intruding into said active path;

securing the sensor to the structure to be measured so that repetitive loads are transmitted through the backing material and into the foil;

subjecting the structure to repeated loading to cause one or more cracks to propagate from the crack initiation features; and, measuring the increase in resistance of the sensor from the initial resistance to a predetermined resistance corresponding with the fatigue life of the structure.

14. The method of claim 13, wherein said one or more cracks propagate across the active paths in a direction generally transverse to the flow of the electric current.

15. The method of claim 13, wherein the step of subjecting the structure to repeated loading to cause one or more cracks to propagate from the crack initiation features of the sensor includes loading without gripping the sensor at its ends.

16. The method of claim 13, wherein loading applied to the structure is transmitted from the structure, through the backing material, and into the sensor, as opposed to loading the sensor at its ends.

17. A strain gage for measuring strain of a structure subjected to repetitive loads applied along a measurement axis, said strain gage comprising:

a conductive foil aligned with the measurement axis and formed by a plurality of grid lines arranged approximately parallel to each other, each of said plurality of grid lines being approximately equal in width and joined in series by a plurality of end loops, each of said plurality of end loops having approximately the same height; and a first and second solder tab electrically connected to the conductive foil;

wherein the height of each of said plurality of end loops is approximately equal to the width of each of said plurality of grid lines.

18. The strain gage of claim 17, wherein the height of each of said plurality of end loops is less than the width of each of said plurality of grid lines.

19. The strain gage of claim 17, further comprising an insulating backing material to which the foil is bonded.

20. The strain gage of claim 17, wherein said plurality of grid lines and said plurality of end loops form a single serpentine-shaped conductive path.

21. The strain gage of claim 17, further comprising outer grid lines extending from said conductive foil, said first and second solder tabs having free ends, and said outer grid lines connecting to the free ends of said first and second solder pads that are located furthest from said plurality of grid lines of said conductive foil.

* * * * *